May 7, 1963

H. T. TKACS 3,088,573

METHOD AND APPARATUS FOR PROCESSING AND
HANDLING FIBROUS MATERIALS

Filed July 18, 1960

INVENTOR.
HENRY T. TKACS
BY

ATTORNEYS

May 7, 1963

H. T. TKACS 3,088,573

METHOD AND APPARATUS FOR PROCESSING AND
HANDLING FIBROUS MATERIALS

Filed July 18, 1960

INVENTOR.
HENRY T. TKACS
BY
ATTORNEYS

United States Patent Office 3,088,573
Patented May 7, 1963

3,088,573
METHOD AND APPARATUS FOR PROCESSING
AND HANDLING FIBROUS MATERIALS
Henry T. Tkacs, Bordentown, N.J., assignor to Owens-Corning Fiberglas Corporation, a corporation of Delaware
Filed July 18, 1960, Ser. No. 43,537
12 Claims. (Cl. 198—20)

This invention relates to the processing and handling of fibrous materials and more especially to the processing and handling of thermal pipe insulation units and more particularly for automatically handling mandrels wrapped with fibrous mineral material such as glass fibers impregnated with a heat-curable resin.

Thermal pipe insulation units have been made by wrapping a length of fibrous insulating mat impregnated with resin about a mandrel and the assemblage of mandrel and wrapped mat placed in a dual section mold and cured by circulating heated air through the interior of the mandrel and the environment surrounding the insulating material. A plurality of such molds are mounted upon radial arms carried by a rotatable frame, and upon completion of a heat curing phase, each mold is automatically opened at an unloading station. Heretofore an attendant manually removes the heat cured insulation unit and mandrel from the opened mold for subsequent processing. Due to the comparatively high temperatures required for curing the resin, the insulation units in the molds are difficult to handle by reason of the heated environment.

The invention embraces a method of and apparatus for automatically and successively removing each mandrel and insulation unit after heat curing from a mold and transferring the same to a conveyor which advances the insulation units to a subsequent station for further processing.

An object of the invention resides in the provision of an apparatus, synchronized with a rotatable frame carrying a plurality of molds enclosed in a curing oven, for automatically and successively removing the insulation units and mandrels from the molds and transferring the same to a continuously operating conveyor for advancing the heat-cured units and mandrels to a station at which a covering is applied to each unit while the same is in heated condition.

Another object of the invention resides in a transfer apparatus in combination with means correlated with a conveyor whereby thermal insulation units are successively delivered to an intermediate transfer mechanism for delivery to a conveyor system, the arrangement embodying means for assuring positive transfer of a unit from a mold to the conveyor system.

Another object of the invention resides in a reciprocable means for transferring fibrous thermal unit and mandrel assemblies from heat curing molds to a conveyor system in timed relation to assure positive conveyance of the assemblies away from the curing zone.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
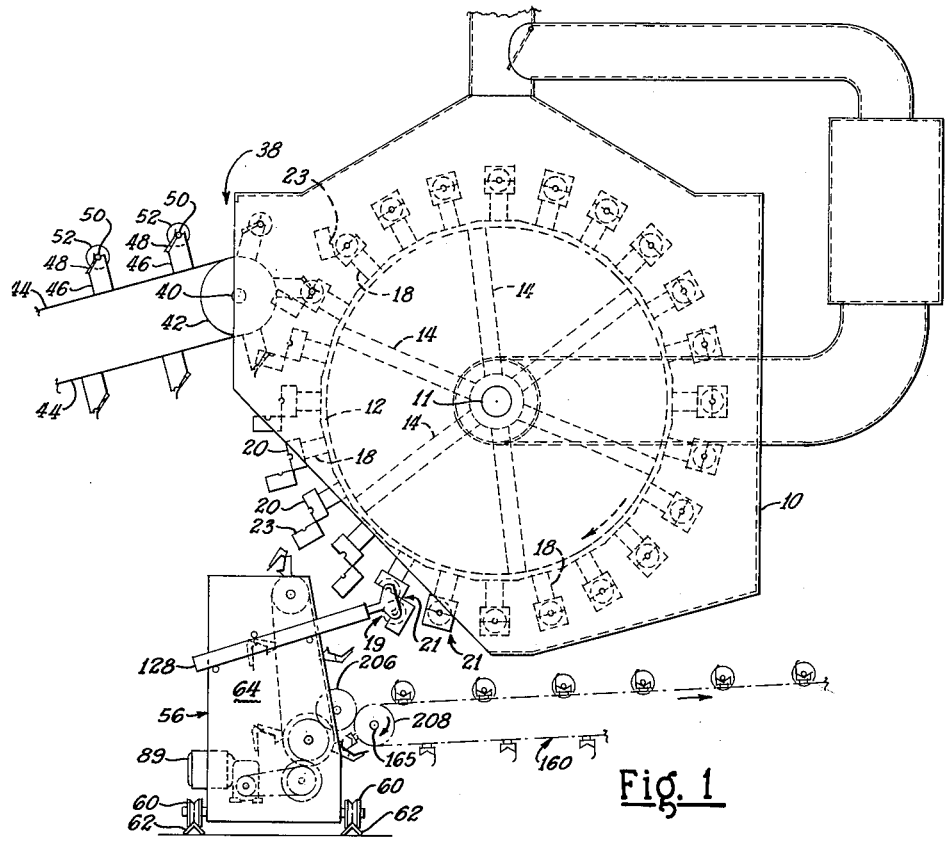
FIGURE 1 is a semidiagrammatic side elevational view of a form of apparatus of the invention in conjunction with a curing apparatus for transferring and conveying cured fibrous insulation units away from the curing oven.

While the apparatus for carrying out the method is illustrated as utilized for transferring and handling heat cured cylindrically-shaped fibrous insulation units of the character employed for insulating pipe, it is to be understood that the method and apparatus of the invention may be utilized for unloading and transferring articles or units of other shapes.

Referring to the drawings in detail, the apparatus of the invention is disposed at the unloading station of a drum or rotatable member carrying radially disposed dual section molds in which hollow mandrels wrapped with mineral fibers, such as glass fibers, impregnated with resin are heat cured.

With particular reference to FIGURE 1, the apparatus for curing the resin in the pipe wrap units is inclusive of an oven 10 in which is journally supported a shaft 11 mounting a hub supporting an annularly shaped member or drum 12 by radial spokes 14, the shaft 11 and drum 12 being rotated at a very low speed by a motor or other suitable means (not shown).

Extending radially from the annular member 12 and substantially equally spaced circumferentially are hollow or tubular mold supports 18, the outer end of each mold support 18 carrying one section 20 of a mold 21 having a semicylindrically shaped surface 22. Pivotally supported to the mold section or portion 20 is a second mold section or portion 23 formed of two pivotally connected parts 24 and 25 which, when the mold is closed, provide a semicylindrical surface 26 which mates with the surface 22 forming a cylindrical configuration. Each of the tubular mold supports 18 is provided with a bracket 28 to which is pivotally connected an arm 30. Each arm is connected by links 32 and 33 with the relatively movable section 23 of the mold, the link 33 being pivotally connected as at 34 to the part 25 of the mold section 23. Each pair of mold sections 20 and 23 are pivotally joined together by a pivot pin 36 and the parts 24 and 25 of each section 23 are pivotally connected by a pin 37. Each of the arms 30 is adapted to be operated by cam means (not shown) for opening and closing the mold sections 20 and 23.

As shown in FIGURE 1, a loading station 38 is provided at which uncured fibrous insulation units and supporting mandrels are conveyed to the molds. Journally supported by suitable means (not shown) is a shaft 40 upon which is mounted sprockets 42 spaced transversely, one of which is shown in FIGURE 1, each sprocket supporting a conveyor chain or belt 44. Mounted on the chains or conveyors 44 are lugs or supports 46, each lug being equipped with a plate spring or flexible plate 48. The distal ends of each pair of lugs 46 in transverse alignment are formed with semicircular recesses to accommodate the end regions of a hollow mandrel 50 upon which is wrapped a mat of insulation of mineral fiber material 52, such as glass fibers, impregnated with a curable bonding resin such as phenolformaldehyde or other suitable heat-curable resin.

As shown in FIGURE 1, the hingedly supported movable mold sections 23 approaching the loading station are in open position with respect to the mold sections 20, the circular mold support frame 14, being rotated in a clockwise direction as viewed in FIGURE 1. As the open mold sections 23 successively approach the loading station 38, the upper flight of the conveyor 44 is advancing toward the loading station at a predetermined rate whereby a fibrous wrapped mandrel 50 is in a position to be delivered into an open mold. As shown in FIGURE 1, the supports or lugs 46 mounted by the conveyor 44 deliver a fibrous wrapped mandrel into an open mold and, as the mold supporting means 14 continues its clockwise rotation, the hinged mold section 23 is closed upon its adjacent section 20 by cam means (not shown) acting through the medium of arms 30 and the links 32 and 33.

The oven 10 is provided with heating means (not shown) whereby heated air or other gas is circulated through the hollow drum or rotatable frame 14 and mold supports 18, through the wrapped fibrous material surrounding each mandrel 50, and through each of the hollow mandrels 50, the air being of a temperature sufficient to heat-cure the phenolformaldehyde or other bonding resin in the fibrous wrapping. The mold support drum 14 rotates at a comparatively low rate so that sufficient time is afforded for curing the resin during the period that the molds move in a circular path from the loading station 38 to the region at which the cured fibrous units are removed or unloaded from the molds.

The present invention includes an arrangement or apparatus for automatically withdrawing the heat-cured fibrous units or lengths from the molds at the unloading station and effecting transfer of the cured units or lengths of fibrous material to a conveyor arranged to convey the units away from the curing station for further processing.

Figure 2:
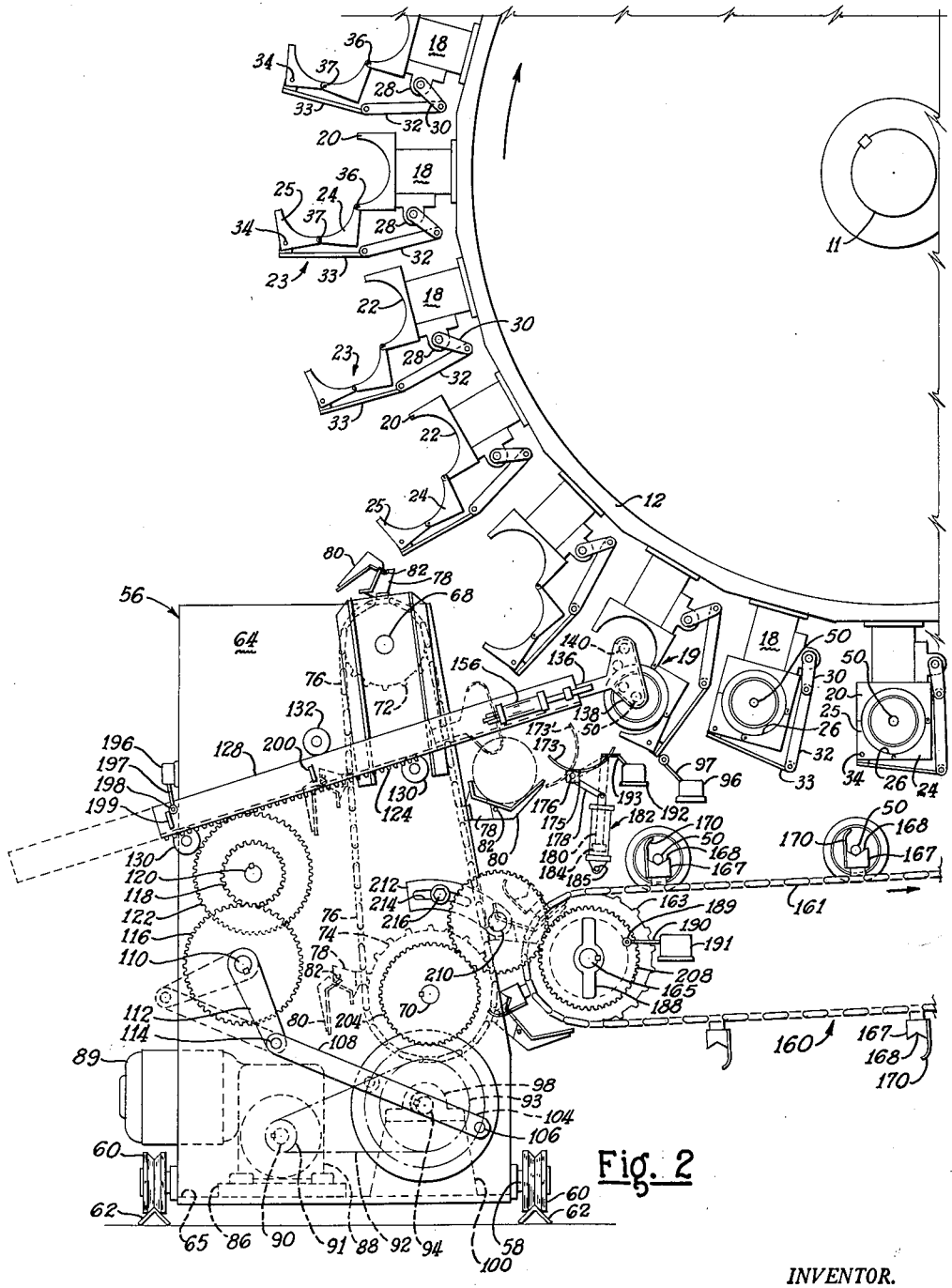
FIGURE 2 is an enlarged elevational view of the insulation unit transfer apparatus shown in FIGURE 1.

The transfer means or mechanism for carrying out the method of the invention is inclusive of a frame or support structure 56 provided at their base region with a pair of shafts 58, one of which is shown in FIGURE 2, provided with grooved rollers 60 which are adapted to engage rails 62 of V-shaped cross section to enable the transfer unit to be moved into or out of an operative position of use.

The frame or frame structure 56 is provided with end plates 64 which are secured to a base plate 65, the end plate 64 being in substantially parallel relation and connected together by suitable cross members (not shown). Journally mounted in suitable bearings carried by the end plates 64 are transversely extending shafts 68 and 70, the shaft 68 being provided with sprockets 72, the sprockets being disposed respectively adjacent the end plates 64. The second pair of sprockets 74 is mounted upon the shaft 70 which are respectively in vertical planes of the sprockets 72. Each set of sprockets 72, 74 is connected by chains 76 which form an endless conveyor means for receiving the lengths or units of fibrous material processed in the molds.

Each of the chains 76 is provided with fittings 78 arranged at uniformly spaced distances along the chains, the fittings 78 being secured to links of the chains. Each of the fittings 78 forms a carrier or support for a cradle-like member 80. Each of the cradles or members 80 is pivotedly or hingedly connected to a fitting by a pivot shaft or member 82.

The cradles 80 are hingedly supported so as to be moved by gravity into a depending or collapsed position when the flight of the chains at the left-hand position as viewed in FIGURE 2 is elevated, the buckets or cradles 80 pivotally moving into an extended position as the right-hand flight of the chains move downwardly as viewed in FIGURE 2. In the latter position the buckets or cradles 80 are extended and adapted to receive the cured lengths or units of fibrous material for descent and transfer to another conveyor or conveying means.

Means is provided for continuously rotating the shaft 70 to actuate the sprockets 72, 74 and the chains 76 carrying the members, lugs or cradles 80. Mounted upon a pedestal 86 supported by the base plate 65 is a housing 88 enclosing speed reducing mechanism or gearing of conventional character, a motor 89 being secured to the housing 88. The motor 89 is preferably of the electrically energizable type. The motor shaft (not shown) drives the speed reducing gearing contained within the housing 88, the speed reducing gearing being connected with an output shaft 90.

Secured upon the output shaft 90 is a sprocket 91 which is connected by means of a driving chain 92 with a driven sprocket 93. The sprocket 93 is rotatably supported upon a shaft 94, the sprocket 93 being connected by a "one revolution" clutch of conventional construction contained within a housing 95, the driven element 87 of the clutch being secured to the shaft 94.

The "one revolution" clutch contained in housing 95 is of the type whereby movement of a clutch dog (not shown) establishes a drive connection to the shaft 94 causing it to rotate through a single revolution, at the completion of which the clutch is automatically disconnected, the sprocket 93 being continuously rotated by the motor 89. A suitable brake mechanism 99 of the shoe type is provided for placing a friction drag upon the shaft 94 so that the shaft does not overrun its position at the completion of the momentary drive provided by the "one revolution" clutch in the housing 95.

The "actuating dog" (not shown) for initiating the operation of the "one revolution" clutch is brought into operation by a solenoid energized by the closing of a switch contained in a housing 96, the switch being provided with an arm 97 shown in FIGURE 2 disposed to be engaged by the relatively movable section 23 of a mold as the mold is opened at the unloading station.

The shaft 94 is journaled in bearings 98 mounted upon blocks or supports 100. Fixedly mounted upon the shaft 94 is a crank arm 104 provided with a crank pin 106 to which is connected one end of a link 108.

Journaled in suitable bearings carried by the end plates 64 is a stub shaft 110 upon which is mounted a crank or crank arm 112 provided with a crank pin 114, the crank pin being connected with the opposite end of the link 108. Mounted upon the shaft 110 is a spur gear 116 which is in mesh with the teeth of a spur gear 118 mounted upon a transversely extending shaft 120 rotatably or journally mounted in bearings carried by the end plates 64. Also secured upon the shaft 120 is a pair of spur gears 122 of larger diameter than the gear 118.

The spur gears 122 are disposed respectively adjacent the end plates 64, the gears 122 being exteriorly of the plates. Each of the spur gears 122 is in mesh with the teeth 124 of an adjacent rack bar, ram or member 128. The rack bars 128 are disposed respectively adjacent the end plates 64 in angular positions with respect to a horizontal plane as particularly shown in FIGURES 1 and 2.

The rack bars 128 are supported for lengthwise movement or reciprocation upon pairs of guide rolls 130 arranged beneath the bars 128, a third guide roll 132 being provided above each of the bars 128 to assure lengthwise reciprocation thereof in defined rectilinear paths.

Means are associated with the reciprocable members or bars 128 for engaging the end regions of a mandrel or end regions of a cured fibrous unit at the unloading station for effecting removal and transfer thereof from a mold. The means associated with the bars are of identical construction. Mounted at the forward end region of each bar 128 is an outwardly extending projection 134 which is of bifurcated construction.

A lever 136 is received by the furcations, the lever being formed with ear portions having openings formed therein aligned with openings formed in the furcations which receive a pivot pin 139 providing a fulcrum for the lever 136. In the embodiment illustrated, each lever 136 is of the first order of levers, viz., the lever being fulcrumed intermediate its ends.

Figure 3:
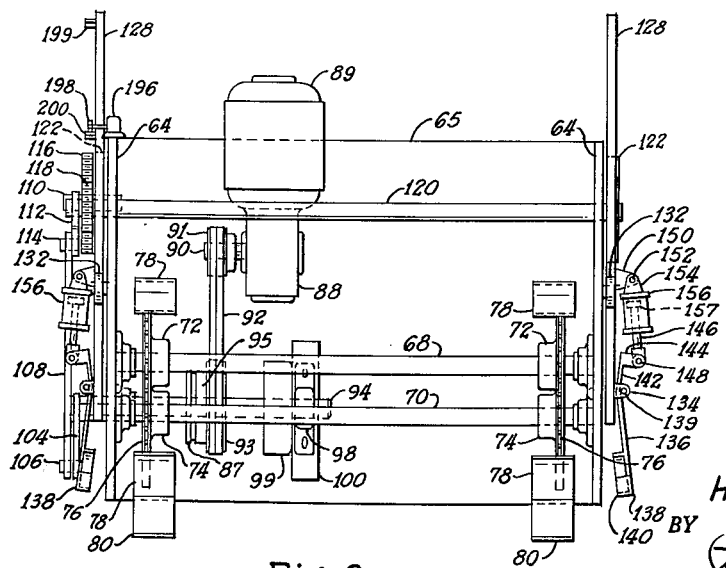
FIGURE 3 is a top plan view of the transfer apparatus shown in FIGURE 2.

The distal end region of each of the levers 136 is formed with a general triangularly shaped portion 138 which is bounded by a peripheral, laterally extending flange 140 as shown in FIGURES 2 and 3. The triangularly shaped portion 138 is of a shape and size to embrace the position of the mandrel 50 of a cured fibrous unit whether the unit adheres to the mold section 20 or adheres to the relatively movable mold section 23.

As shown in FIGURE 2, the cured fibrous unit has adhered to the mold section 23 when the latter has been moved to open position and the ends of the mandrel 50 are embraced within the flanges 140 at the lower apices of the triangularly shaped member 138. Through the medium of the triangular figuration, the mandrel and its associated fibrous unit will be engaged by the lever 136 irrespective of whether the unit adheres to the mold section 20 or to its reciprocal section 23.

The arm 142 of each lever 136 is formed with a laterally extending bifurcated projection 144, the end portion of a piston rod 146 is received between the furcations and is pivotally connected thereto by a pin 148. Mounted upon each of the bars or members 128 is an outwardly extending member 150 provided with a pin 152 which extends through openings in a bifurcated member 154 integrally formed at an end region of a cylinder 156. The piston rod 146 extends into the cylinder and is provided with a piston 157 which is reciprocable in the cylinder 156.

Each cylinder and piston assembly provides an actuator unit which is fluid operated to effect pivotal movement of the lever 136 associated therewith for moving the region 133 of the lever transversely toward or away from the end of a mandrel 50 and fibrous unit associated with the mandrel. The pistons 157 in the cylinders 156 may be actuated by air under pressure, oil or other suitable fluid, although it is preferable to use compressed air as an actuating medium.

Associated with the heat curing oven or plenum arrangement 10 for the fibrous pipe wrap units 52 is an endless conveyor 160 which comprises a pair of transversely spaced chains 161, each chain engaging a sprocket 163, the sprockets being mounted upon a shaft 165 journaled in suitable bearings (not shown). The chains 161 engage another set of sprockets (not shown). A motor (not shown) is adapted to rotate the sprockets 163 or the second set of sprockets, the sprockets being rotated in clockwise directions as viewed in FIGURES 1 and 2.

Supported at spaced regions on the chains 161 of the conveyor 160 are pairs of lugs or supports 167 extending normal to the direction of the movement of the flights of the conveyor. The lugs or supports 167 are provided with V-shaped configurations 168 which are adapted to receive and support the mandrels 50 contained within the cured fibrous articles or units 50. Each of the lugs 167 is equipped with a hook like member 170 providing a guide means for assuring engagement of a mandrel of a fibrous unit with the support.

The lugs 167 of each pair carried respectively by the transversely spaced endless chains 161, are in transverse alignment to receive and support successive mandrels which are conveyed away from the transfer region by the endless conveyor 160. Disposed adjacent the station at which the fibrous units and associated mandrels are unloaded from the mold sections 22 and 24 is an element or cradle 173 which is mounted upon a transversely extending bar 175 provided with pivots 176 mounted in suitable supports (not shown) for pivotal movement of the cradle to a broken line position illustrated at 173'.

The bar 175 is provided wtih an arm 178. The distal end of the arm 178 is pivotally connected with a piston 180 of a fluid actuator cylinder 182, the rod 180 being provided with a piston 184 which is reciprocable in the cylinder 182. The lower end of the cylinder 182 is pivotally connected by a pin 185 with a support (not shown) to facilitate angular movement of the cylinder 182 and piston rod 180 during relative movement of the piston rod in moving or actuating the cradle 173.

The element or cradle 173 provides a means disposed at the unloading station to receive a fibrous unit should any malfunction of the levers 136 or other mechanism occur in removing a mandrel and unit from a mold. The fluid actuator provided by the cylinder 182 and piston 184 is arranged to be activated at a proper time to rock the cradle 173 into the broken line position indicated at 173' to discharge a fibrous unit and mandrel onto the receiving members 78 in the event that a mandrel and fibrous unit have not been successfully withdrawn from the mold sections by the levers 136 carried by the reciprocable members or bars 128.

Through the employment of the cradle 173, positive transfer of a mandrel and associated fibrous unit from an open mold is assured either by the levers 136 and members 128 or the cradle 173.

The operation of the cradle 173 is controlled or activated in timed relationship with movement of the endless conveyor 160. As shown in FIGURE 2, a diametrically extending member 188 is fixedly mounted on the shaft 165 to rotate with the shaft.

The ends of the member 188 are adapted to engage a roller 189 carried upon an arm 190 of a microswitch contained in the housing 191, the microswitch in housing 191 is in circuit with a solenoid actuated valve means of conventional construction (not shown) for controlling the flow of compressed air or other fluid under pressure to the actuator cylinder 182 to effect a rocking movement of the cradle 173.

A second switch 192 has an arm 193 disposed to be engaged by the arm 178 at the uppermost limit of movement of the latter, the arm 193 actuating the switch 192 to move the solenoid operated valve means (not shown) for returning the piston 180 to its initial position with the cradle 173 disposed in its normal unit-receiving position.

The operation or activation of the fluid actuator units 156 for moving the levers 136 carried by the reciprocable bars 128 is controlled by means mounted by the bars 128. Mounted upon the frame 56 is a 4-way valve 196 equipped with an arm 197 provided with a roller 198 which projects into the paths of abutments 199 and 200 carried by one of the bars 128. When the bars 128 are in their extreme forward positions as viewed in FIGURE 2, the abutment 199 engages the roller 198 actuating the valve mechanism 196 to effect flow of fluid under pressure to the actuator cylinder 156 and beneath the pistons 157 to effect pivotal movement of the levers 136 toward each other to dispose the regions 140 of the levers 136 adjacent the ends of a mandrel 50 so that the flange portions 140 embrace the ends of the mandrel.

Upon return movement of the rams 128, the levers 136 are held in engaging relationship with the mandrel and its associated fibrous unit to withdraw the mandrel and unit to a transfer station at which the mandrel and unit is delivered into one of the collapsible cradles, supports or carriers 80 mounted by the conveyor chains 76 as hereinafter described.

The endless conveyor 76 carried by the frame 56 is preferably driven by means associated with one of the sprockets 163 of the second endless conveyor means 160. As particularly shown in FIGURE 2, the shaft 70 journaled upon the frame 56 and carrying the sprockets 74, is provided with a gear 204 which is in mesh with a gear 206. Mounted upon the shaft 165 which supports the sprocket 163 is a spur gear 208. A gear 206 is mounted upon a stub shaft 210 journally supported in bearings mounted or carried by an adjustable plate 212.

The plate 212 is provided with an arcuate slot 214, the curvature of which is generated about the axis of the shaft 70. One or more clamping bolts 216, one being shown in FIGURE 2, projects through the slot 214 into threaded openings formed in the adjacent end plate 64 of the frame 56. By releasing the clamping bolt or bolts 216, the plate 212 carrying the gear 206 may be moved into mesh with the spur gear 208 driven by the shaft 165.

Thus the transfer conveyor 76 is driven by the power source which drives the endless conveyor 160 through the enmeshment of gear 208 with the gear 206 and enmeshment of gear 206 with the gear 204, the latter driving the chains of the transfer conveyor 76 which transfers the cured fibrous units and associated mandrels to the projections or lugs 167 carried by the second conveyor 160.

The operation of the article unloading and transferring apparatus is as follows: The frame structure 56, mounted by the rollers 60 on the rails 62, is moved into the position shown in FIGURES 1 and 2 to associate the apparatus with the fibrous article heat curing facility and the conveyor mechanism 160. With the frame structure and components carried thereby moved into the position illustrated in FIGURES 1 and 2, the gear 206 is adjusted by loosening the clamping bolt 216 to enmesh the teeth of the gear 206 with the teeth of the gear 208 which is driven by the drive means which operates the conveyor 160.

The drive means may be a motor connected with the shaft 165 or with another sprocket supporting the conveyor or the conveyor chains 160. The clamping bolt 216 is then drawn up to retain the gear 206 in mesh with the gear 208 to establish a drive to the gear 206. The gear 206, being in mesh with gear 204, establishes a drive for the chains 76 of a first conveyor or article transfer means. Thus the chains 76, carrying the cradles or carriers provided by the pairs of members 78 and 80 are driven at a speed coordinated, synchronized or timed with the speed of movement of the second conveyor 160.

The articles to be processed and handled through the arrangement of the invention are lengths of fibrous material 52 which have been previously wrapped around a hollow or tubular or mandrel 50 and previously placed upon the supporting blocks or projections 46 spacedly arranged on the continuous conveyor 44 shown in FIGURE 1 which is arranged to deliver the fibrous lengths or units 52 to the curing oven or plenum 10 at a loading station 38.

The oven or plenum 10 is configured to direct circulating heated air through the region containing the rotatable frame 12, the dual curing molds 20 and through the hollow mandrels. The mechanism for controlling the opening of the multi-section curing molds is arranged to open each mold as it approaches the unloading station 19, a mold being shown in open position at the unloading station in FIGURES 1 and 2. The mold supporting frame or structure 12 is rotated by suitable means (not shown) at a comparatively slow rate in a clockwise direction as viewed in FIGURES 1 and 2.

The pivotally supported sections 23 of the molds remain open during their rotation from the unloading station to a region slightly beyond the loading station 38. As each open mold approaches the loading station 38 a resin-impregnated fibrous article, unit or length of uncured pipe wrap with its associated tubular mandrel 50 is deposited or delivered into an adjacent open mold as shown in FIGURE 1. As the open mold, with the mandrel and article therein moves away from the loading station 38, suitable cam mechanism (not shown) closes the movable section 23 of the mold.

The molds are rotated through the oven or plenum 10 at a speed and under the influence of circulating heated air at a temperature under conditions which will effect curing of the phenolformaldehyde resin or other curable binder in the fibrous material during the traverse of a mold from the loading station to the unloading station.

As a mold containing a cured length of pipe wrap approaches the unloading station 19, cam mechanism (not shown) associated with the rotatable mold carrying frame 14 actuates the arm 30 and links 32 and 33 to fully open the mold.

The relatively movable section 23 of the mold engages the arm 97 of the switch means contained in the housing 96, shown in FIGURE 2, which energizes a solenoid means of conventional construction to actuate the clutch dog to initiate a revolution of "one revolution" clutch contained in the housing 95. The shaft 94 is thereby rotated through one complete revolution and the link 108 moved by the crank arm secured to the shaft 94.

The link 108, being connected with the arm 112, rotates the shaft 110 and the gear 116 through a portion of a revolution and, through the medium of the gear 118, the gears 122, engaging the teeth of the rack bars 128, is rotated an amount sufficient to move the rack bars 128 and levers 136 from the broken line positions indicated in FIGURE 2 to the full line position with the triangularly shaped portions 138 of the levers 136 adjacent the ends of a fibrous unit and its associated mandrel 50 in the open mold at the unloading station 19.

As the rack bars 128 reach their extreme forward positions, the abutment 199 at the rear end region of one of the rack bars engages the roller 198 of the switch arm 197 to operate valve means in the housing 196 to direct fluid under pressure into the pivotally supported ends of the cylinders 156.

The fluid under pressure entering the cylinders actuates the pistons 157, swinging the levers 136 toward the fibrous unit 52 positioning the flanges 140 so as to embrace the ends of the mandrel in the open mold, whether the fibrous unit adheres to the mold section 20 or adheres to the open mold section 23.

As shown in FIGURE 2, the fibrous unit 52 at the unloading station is positioned in the open section of the mold and the ends of the mandrel 50 of the unit are embraced in the lower region of the areas encompassed within the flange 140. The forward movement of the rack bars 128 takes place during the first half of a revolution of the shaft 94.

During the remaining one-half revolution, the link 108 moves in the opposite direction, rotating gears 116, 118 and 122 in the opposite direction and, through the medium of the rack teeth 124 in mesh with the gear 122, the rack bars 128 are retracted to the broken line position indicated in FIGURE 2. This retractive movement of the bars 128 moves the levers 136, the fibrous unit and its associated mandrel 50 to a position adjacent and above one of the cradles or carriers provided by the fittings 78 and 80.

As the rack bars approach their retracted positions, the abutment 200 on one of the rack bars engages the roller 198, swinging the arm 197 to operate the valve contained in the housing 196 to direct fluid under pressure into the opposite ends of the cylinders 156, retracting the pistons 157 to swing the levers 136 in directions to release the ends of the levers from engagement with the mandrel 50 of the transferred unit, the released unit falling by gravity into the carrier adjacent the unit.

As the conveyor chains 76 and the carriers associated therewith move in synchronous relation with the conveyor 160, the carrier supporting the transferred unit moves downwardly and deposits the cured unit upon a pair of projections 167 with the mandrel of the unit engaging in the V-shaped configurations 168, the upper flight 161 of the conveyor 160 moving the transferred unit away from the carrier for further processing. The conveyor flight 161 moves the cured pipe wrap units to a station (not shown) at which the fibrous units are stripped from the mandrels and an exterior wrapping or envelope of cloth or other material applied.

The cradle 173 shown in FIGURE 2 is normally in a position adjacent an open mold as shown in full lines so that in the event of malfunction of the levers 136 or for other reason the cured unit at the unloading station is not retained in either mold section until engaged by the levers 136, the cured unit may fall by gravity onto the cradle 173. The cradle 173 is arranged to be tilted at the removal and transfer of each unit from a mold to deliver any unit that may fall into the cradle into an adjacent carrier provided by the components 78 and 80.

The diametrically arranged member 188 mounted on the shaft 165 engages, at the proper time, the roller 189 to actuate the switch arm 190 and the switch contained in housing 191 to operate a solenoid valve (not shown) directing compressed air or other fluid into the lower end of the cylinder 182 to effect upward movement of the piston 184 and arm 178 to tilt or rock the cradle 173 to the broken line position indicated at 173' shown in FIGURE 2, which action transfers a unit that may be supported by the cradle onto the adjacent carrier mounted by the conveyor 76.

The direction of fluid pressure onto the cylinder 182 is subsequently reversed through the contact of the end 180 of arms 178 with an arm 193 of a switch 192 which operates the solenoid valve to direct fluid under pressure into the upper end of the cylinder 182 to return cradle 173 to its normal or full line position. The hook members 170 on the projections 167 assure transfer of the units from the carriers on the first conveyor 76 to the receiving members 167 on the second conveyor 160.

Through the method and apparatus of the invention, the cured fibrous units are automatically and quickly withdrawn from the molds at the unloading station, delivered or transferred onto a carrier of the first conveyor 76, delivered from the carrier onto the second conveyor 160 and conveyed away from the carrier and loading station for further processing. The transfer is effected in a comparatively short space of time so that the heat-cured units and mandrels which are at a comparatively high temperature, are transferred to a wrapping station in a heated condition which facilitates stripping the heated mandrel from the cured unit and transferring it immediately to a wrapping station to receive a wrapping of resin-impregnated mineral fibers in preparation for delivery to the loading station of the rotary oven or plenum.

It will be apparent that, within the scope of the invention, modifications and different arrangements may be made other than as herein disclosed, and the present disclosure is illustrative merely, the invention comprehending all variations thereof.

I claim:

1. Apparatus for handling heat-cured pipe wrap units of resin-impregnated fibrous material wherein each unit contains a mandrel including, in combination, a frame, a pair of unit transferring members movably mounted on the frame, means including a pair of bars mounted by said members and movable relative thereto for supporting a unit and its mandrel during transfer, relatively movable cradle means supported by the frame arranged to receive successive pipe wrap units and mandrels transferred by said members, a movable endless conveyor, said conveyor having projections arranged to engage and transfer units in the cradle means away from the cradle means.

2. The method of handling heat-cured molded lengths of resin-impregnated fibrous material at a mold unloading station including engaging the respective end regions of a length of the material by relatively movable surfaces at the unloading station, withdrawing the length of cured fibrous material from the mold by the surfaces, transferring the length of fibrous material by the surfaces to a cradle, moving the length of fibrous material by the cradle away from the surfaces, and engaging the length of fibrous material on the cradle by a moving conveyor to convey the length of fibrous material away from the cradle.

3. Apparatus for handling lengths of fibrous material including in combination, a frame, a pair of members movably mounted on the frame, means for moving said members, means mounted by said members movable into and out of engagement with the end regions of lengths of fibrous material for transferring the lengths of material, an endless conveyor supported by said frame, a plurality of carriers for the lengths of material mounted on said conveyor arranged to receive successive transferred lengths of material, a second movable conveyor having spaced lugs provided thereon, said second conveyor being movable in a direction to engage the lugs with lengths of material on the carriers for conveying the lengths of material away from the carriers.

4. Apparatus for handling lengths of fibrous material including in combination, a support, a pair of members reciprocably mounted on the support, means for reciprocating said members, an element mounted by each of said members, said elements being arranged for movement relative to said members into and out of engagement with the lengths of fibrous material, means actuated by said members in one position for engaging the elements with the lengths of fibrous material and in another position for disengaging the elements from the material, a plurality of carriers for the lengths of material movably mounted on the support arranged to receive successive lengths of material transferred by said elements, a movable conveyor provided with means to engage the lengths of material supported by the carriers, said conveyor being movable in a direction for conveying the lengths of material away from the carriers.

5. Apparatus for handling lengths of fibrous material including in combination, a frame, a pair of members reciprocably mounted on the frame, means for reciprocating said members, an element movably supported by each of said members, means associated with said members engageable with the lengths of material for transferring the lengths of material, a plurality of carriers for the lengths of material movably supported by the frame arranged to receive successive lengths of material transferred by said members, a conveyor having spaced blocks provided thereon, said conveyor being movable in a direction to engage the blocks with lengths of material on the carriers for conveying the lengths of material away from the carriers.

6. Apparatus for handling lengths of fibrous material including in combination, a support, a pair of members reciprocably mounted on the support, means for reciprocating said members, an element movably supported on each of said members, said elements being arranged for movement relative to said members into and out of engagement with the end regions of lengths of fibrous material, means actuated by said members in one position for engaging the elements with the lengths of fibrous material and in another position for disengaging the elements from the lengths of material, a first conveyor movably mounted by the support, a plurality of carriers for the lengths of material mounted on the first conveyor arranged to receive successive lengths of material when said elements are disengaged from the lengths of material, a second movable conveyor having spaced lugs provided thereon, said second conveyor being movable in a direction to engage the lugs with lengths of material on the carriers for conveying the lengths of material away from the carriers.

7. Apparatus for processing fibrous materials for use with an oven equipped with a plurality of curing molds movable to open and closed positions for heat-curing resin-impregnated fibrous bodies including, in combination, a support, a plurality of spaced body-receiving carriers movably mounted by the support; means for moving the carriers, a plurality of reciprocable bars mounted by the support, body-engaging means carried by the bars arranged for engagement with a body when a mold containing the body is in open position, means for reciprocating said members for transferring successive bodies from opened molds to a region in the path of travel of the body-receiving carriers, means for effecting relative movement of the body-engaging members to effect transfer of a body to the body-receiving carriers, a movable conveyor having projections thereon in spaced relation, said conveyor being movable in a direction to engage the projections with successive bodies supported by the body-receiving carriers to convey the bodies away from the carriers.

8. The method of handling heat-cured resin-impregnated fibrous pipe wrap units including the steps of moving spaced surfaces into engagement with a mandrel in a pipe wrap unit at the completion of a heat-curing operation, retracting the surfaces and heat-cured unit from the heat-curing region, moving a cradle adjacent the retracted unit, effecting relative movement of the unit engaging surfaces relative to the cradle to release the unit onto the cradle, moving a conveyor in a different direction relative to the cradle, and engaging the unit in the cradle by the moving conveyor and thereby transferring the unit from the cradle to the conveyor.

9. Apparatus for processing fibrous pipe wrap units for use with a plurality of movable curing molds adapted to be successively opened and closed for curing the pipe wrap units including, in combination, a support, a relatively movable elevator mounted by the support, a plurality of spaced unit receiving cradles carried by the elevator, means for driving the elevator, a plurality of relatively movable bars mounted by the support, a unit engaging element mounted on each of said bars arranged for engagement with spaced regions of a unit when a mold containing the unit is adjacent said bars, means for moving the bars relative to the cradles for transferring successive units from the molds to a region in the path of travel of the cradles to effect delivery of successive units to the cradles, and a movable conveyor arranged to successively engage units carried by the cradles and convey the units away from the cradles.

10. Apparatus for processing bodies of fibrous material for use with an oven equipped with a plurality of movable curing molds adjustable to open and closed positions including, in combination, a frame, a first endless conveyor means mounted on the frame, a plurality of spaced body receiving carriers mounted on the endless conveyor means, means for driving the endless conveyor means, a plurality of longitudinally reciprocable bars mounted by the frame, body engaging elements mounted on the bars arranged for engagement with spaced regions of a body when an opened mold containing a body is in a position adjacent the body engaging elements, means for retracting said bars for transferring successive bodies from the molds to a region in the path of travel of the body receiving carriers, means rendered operative with the bars in retracted position to actuate the body engaging elements to transfer a body to a body-receiving carrier, and a second movable conveyor arranged to engage and remove bodies from said carriers and convey the bodies away from the carriers.

11. Apparatus for processing pipe covering bodies of fibrous mineral materials for use with an oven arranged to heat-cure resin-impregnated fibrous pipe covering bodies wherein the oven contains a plurality of movable curing molds adjustable to open and closed positions including, in combination, a frame, a movable elevator supported by the frame, a plurality of spaced body-receiving cradles carried by the elevator, a plurality of longitudinally reciprocable bars mounted by said frame, body engaging elements mounted on said bars arranged for engagement with spaced regions of a body when a mold containing the body is moved adjacent the elements and is in open position, means for reciprocating said bars for transferring successive bodies from open molds to a region in the path of travel of the cradles on the elevator, means for actuating the body-engaging elements to transfer of a body to a cradle, and a conveyor having projections thereon arranged in spaced relation, said conveyor being movable to engage the projections with successive bodies carried by the cradles to successively convey the bodies away from the cradles, the movement of said elevator and cradles being synchronized with the movement of the conveyor.

12. Apparatus for handling elongated bodies of fibrous material including, in combination, a frame, a pair of body transferring members movably mounted on said frame, means mounted by said members and movable relatively thereto engageable with the fibrous bodies for supporting the bodies during transfer, relatively movable cradle means supported by the frame arranged to receive successive elongated bodies tarnsferred by said members, a movable endless conveyor, said conveyor having projections arranged to engage elongated bodies in the cradle means and convey the bodies away from the cradle means.

References Cited in the file of this patent

UNITED STATES PATENTS

| | | |
|---|---|---|
| 1,479,809 | Headley | Jan. 8, 1924 |
| 1,947,609 | McNamara | Feb. 20, 1934 |
| 1,975,394 | Hartman | Oct. 2, 1934 |
| 2,424,252 | Orlando | July 22, 1947 |
| 2,853,108 | Hait | Sept. 23, 1958 |

FOREIGN PATENTS

| | | |
|---|---|---|
| 64,423 | Sweden | July 9, 1925 |